Nov. 9, 1965     M. G. GABRIEL     3,216,197
DUAL FLUID COUPLING DRIVE
Filed Oct. 23, 1963
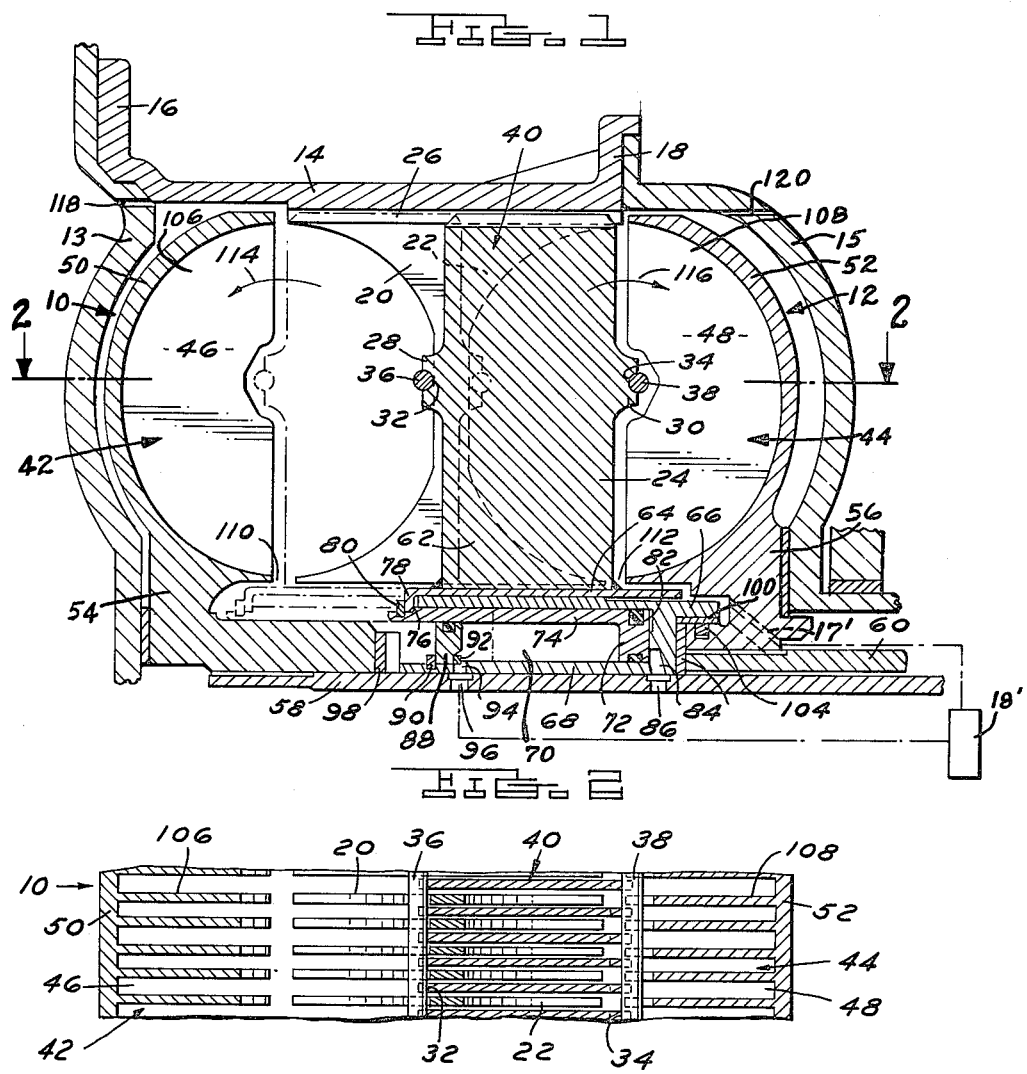
MARTIN G. GABRIEL
INVENTOR
BY John R. Faulkner
Robert E. McCollum
ATTORNEYS

3,216,197
DUAL FLUID COUPLING DRIVE
Martin George Gabriel, Dearborn, Mich., assignor to Ford Motor Company, Dearborn, Mich., a corporation of Delaware
Filed Oct. 23, 1963, Ser. No. 318,286
4 Claims. (Cl. 60—54)

This invention relates to a hydrodynamic torque transmitting mechanism. More particularly, it relates to one comprising a plurality of adjacent hydrodynamic drive devices selectively operable to transmit torque between a number of rotatable shafts. The invention is adapted particularly for use in connection with a transmission for an automotive vehicle to selectively establish a number of power paths from an engine to the transmission gearing. The invention, however, will have use in many other installations wherever the selective drive of a plurality of shafts from a single shaft is desired, or vice versa; that is, the selective drive of a single shaft from a number of power input shafts.

In the field of motor vehicle transmissions, it is known to use a number of hydrodynamic drive devices, such as, for example, fluid couplings, torque converters, or the like, that are selectively filled or emptied of operating fluid to establish or break a driveline from one or more power sources to different portions of the transmission. Normally, these hydraulic devices are completely emptied of operating fluid to interrupt the transmission of torque therethrough, and then refilled to render the device operative. To meet the large fluid requirements necessitates the use of a large capacity fluid pump. Since the manufacturing costs of a pump increase as a function of its capacity, the larger pump adds considerably to the cost of the overall transmission package.

The invention provides a multi-fluid coupling construction having couplings that remain filled with fluid at all times, whether they are operable to transmit torque or not. Control of the couplings to determine which will be operative at any particular time is provided by means that moves into or out of the fluid circuit of each coupling to control the fluid circulation, and, therefore, the transmission of torque through the device. Also, this latter means is such that as one coupling becomes operative, the remaining couplings become inoperative. Since the couplings remain filled at all times, the fluid requirements are lessened, and a fluid supply pump of smaller capacity than normally would be required, in the case of fill and empty type couplings, for example, is adequate. The overall manufacturing costs are thereby reduced, and control of the selectivity of operation of the couplings is simplified.

The invention accomplishes the above objectives by providing the several hydrodynamic drive devices with a common impeller that is movable selectively into or out of operating position with respect to each of the fluid couplings.

One of the objects of the invention, therefore, is to provide a hydrodynamic torque transmitting assembly consisting of a number of adjacent hydrodynamic drive devices that are constantly filled with fluid and provided with a movable rotating element that is common to all of the drive devices for completing the drive through any one of the couplings.

It is another object of the invention to provide a hydrodynamic torque transmitting assembly consisting of a number of adjacent fluid couplings having a common impeller selectively movable into and out of operating position with respect to each coupling.

It is a still further object of the invention to provide a hydraulic torque transmitting assembly consisting of a plurality of associated fluid couplings having turbines alternately cooperating with a single axially movable impeller.

It is also an object of the invention to provide a hydraulic torque transmitting assembly of the type described wherein the common impeller is so constructed and arranged that it moves progressively out of the fluid circuit of one fluid coupling to progressively terminate its operation, and progressively moves into the fluid circuit of another coupling to progressively initiate its operation.

Other objects, features, and advantages of the invention will become apparent upon reference to the succeeding, detailed description thereof, and to the drawing illustrating the preferred embodiment thereof; wherein, FIGURE 1 is a cross-sectional view of a portion of one-half of a hydraulic transmitting assembly embodying the invention, and, FIGURE 2 is a cross-sectional view of a portion of the showing in FIGURE 1, taken on a plane indicated by and viewed in the direction of the arrows 2—2 of FIGURE 1.

FIGURE 1 shows the upper half of a hydraulic torque transmitting assembly consisting of two fluid couplings 10 and 12 arranged in a side-by-side relationship. The couplings are enclosed by an annular impeller and coupling housing having sections 13, 14 and 15. At its forward end, the housing has a flange 16 adapted to be bolted or otherwise secured to the flywheel (not shown) or other portion of a power input shaft. The input shaft may be connected to any suitable source of power, such as, for example, an internal combustion engine for a motor vehicle.

The bell-shaped housing section 15 surrounding a portion of coupling 12 generally is fixed to a sleeve shaft on which is nonrotatably mounted the drive pinion of a fluid pressure supply pump (not shown). The pump provides the necessary operating fluid requirements for both couplings 10 and 12, as well as the actuating fluid under pressure to move coupling elements to be described. The housing sections together surround and enclose both couplings 10 and 12, and define a fluid chamber filled at all times.

A number of integral back-to-back impeller outer shroud sections 20 and 22 depend radially from housing section 14, and are fixed to it in any suitable manner. The shroud sections are circumferentially spaced and substantially semi-cylindrical in cross section. Together they constitute an annular shroud defining a semi-toroidal path for flow of fluid. An axially movable impeller blade 24 partially fills each of the circumferential spaces between the shroud sections, the blades being slidably splined at their outer peripheries to internal splines 26 on housing section 14.

The impeller or pump blades are substantially rectangular in cross section, and are generally of thin metal. They are of a width approximately equal to one-half of the width of the integral shroud assembly 20, 22, so that the blades in either of their extreme axial positions cooperate generally with only one turbine member, in a manner to be described. The blades have laterally or axially extending flanges 28 and 30 provided with groves 32 and 34 for receiving ring members 36 and 38. The ring members lend rigidity to the blades, and serve to locate the blades in their extreme axial positions when the rings abut the surface of the shrouds 20 and 22. The blades 24, together with shroud sections 20 and 22, define an impeller or pump unit 40.

Each of the couplings 10 and 12 contains a rotatable turbine unit or element 42 and 44 adapted to cooperate with the single impeller unit 40. Both turbine units are constructed in a similar manner, having a number of circumferentially spaced turbine blades 46 and 48 suitably secured within annular outer shrouds 50 and 52, respectively. The hubs 54 and 56 of turbines 42 and 44, respectively, are splined to sleeve shafts 58 and 60 for rotation therewith, sleeve shaft 60 being rotatably mounted about shaft 58.

As stated previously, the impeller can be moved axially from the full line position shown, cooperating with turbine 44, to the extreme left-hand dotted line position, where it cooperates with the turbine 42. In so moving, the impeller blades 24 in effect move out of the fluid circuit of coupling 12, and into the fluid circuit of coupling 10. The half of the coupling 12 defined by the shroud section 22 then contains only fluid.

To move the impeller blades, the inner peripheral portion 62 of each of the pump blades is welded or otherwise secured to an annular base member 64. The base member is rotatably and axially slidable on an annular support 66 having substantially a U shape in cross section. The hub 68 of base 66 is internally journaled, and supports shaft 58 for rotation relative to it. The U-shaped recess 70 of support 66 slidably receives an annular piston 72 having an axial extension 74. The extension has a shouldered portion 76 against which is positioned a radial flange 78 depending from the impeller base 64. The flange is nonrotatably held against the piston flange by a snap ring 80 to assure a unitary movement of the impeller blades and piston 72.

The piston 72 is sealingly mounted in the recess 70. One end of the recess has a further smaller diameter bore 82 connecting with a bore 84 and a bore 86 through the shaft 58, to received fluid pressure for moving the piston 72 in one direction. The opposite end of recess 70 is closed by an annular end plate and stop member 88 sealingly engaging the extension 74. The end plate is axially located on the hub 68 between snap rings 90 and 92. A bore 94 is provided in the hub 68 connecting with another bore 96 in the shaft 58. Fluid under pressure may be supplied alternately to bores 96 or 86 from the fluid supply pump (not shown) to move the piston 72 in either axial direction, thereby effecting a movement of extension 74 and the impeller blades 24 in the same direction.

The turbine 42 is located axially by means of an annular thrust washer 98 between the hub 68 and the turbine hub 54. Turbine 44 is rotatably and sealingly mounted in a similar manner about the member 66 by bearing members 100 and 102, and ring seal 104.

In operation, both of the operating chambers 106 and 108 of couplings 10 and 12 are filled with fluid at all times through suitable passages leading to the inner peripheral inlet portions 110 and 112 of the couplings. The couplings are of the constant flow type; that is, fluid continually passes through the inlets 110 and 112, circulates around the couplings in the directions of the arrows 114 and 116, and discharges through the restricted outer peripheral openings 118 and 120 to the area enclosed by the coupling housing sections 13, 14 and 15.

As will be clear from an inspection of the drawing, the impeller blades 24, in their extreme positions, cooperate with only one coupling at a time to transmit torque through that particular coupling. The other coupling at this time is inoperative, since no circulation of fluid occurs. Each of the couplings operates in a known manner when the impeller blades are located in a position to cooperate with the turbine blades for that particular coupling. The rotation of the impeller imparts a toroidal circulation of flow to the fluid, effecting a rotation of the turbine blades.

In operation, therefore, movement of the impeller blades by piston 72 to the full line position shown places the impeller blades in a position to transmit torque to the turbine blades 48. Therefore, upon clockwise rotation of the housing 14 (out of the plane of FIGURE 1), the impeller blades are rotated, effecting a circulation of fluid in a clockwise direction as indicated by the arrow 116. The fluid then discharges from the impeller blades against the turbine blades 48, driving the turbine member 44 in a clockwise direction. The torque of the input shaft is thus transmitted through cover 14, impeller blades 24, and turbine blades 48 to shaft 60. Turbine 42 at this time remains stationary, since rotation of shroud section 20 does not impart any circulation of flow to the fluid in coupling chamber 106. Any kinetic energy developed by the rotating shroud portion 20 is dissipated through the large volume of stationary fluid in operating chamber 106.

When it is desired to terminate operation of coupling 12 and begin transmitting torque through coupling 10 to shaft 58, fluid under pressure is admitted through bores 86 and 84 into chamber 82 to move piston 72 to the dotted line position against end plate 88. In this position, the impeller blades 24 are in operative position with respect to turbine blades 46, and are completely out of the operating chamber 108 of coupling 12. Rotation of the impeller blades then imparts a counterclockwise circulation to the operating fluid in chamber 106, effecting a drive of the turbine blades 46 in the same direction. The torque of the input shaft is thus transmitted to shaft 58 through coupling 10.

It is to be noted that the movement of piston 72 is a progressive one, and moves the impeller blades 24 infinitely between positions, thereby effecting a smooth transition from one operating stage to another. The movement can be slow, or the piston can move with a snap-action, as desired. The termination of operation of one coupling and the beginning of operation of the other coupling is done in a progressive manner, and, therefore, is done smoothly. Accordingly, when a hydrodynamic device constructed according to the invention is used in connection with a motor vehicle transmission to establish different gear ratios, the change between ratios will be accomplished in a very smooth manner, which is desirable. It should also be noted that the change from operation of one coupling to the other can be accomplished without a reduction in speed of the input shaft, since the couplings are fluid filled at all times.

While the invention has been shown for use in connection with two fluid couplings, it will be clear that it would have equal use with more couplings, or with two or more fluid torque converters; and that the impeller blades 24 may be moved axially by mechanical, electrical, or other known actuators, instead of the piston-operated means shown. It will also be seen that while the embodiment of the invention illustrates a selective drive of two shafts from one drive shaft, a drive of a single shaft from either of two power input shafts would not depart from the scope of the invention.

From the foregoing, therefore, it will be seen that the invention provides a multi-hydrodynamic drive assembly consisting of a number of hydraulic torque transmitting devices having a common rotatable element movable into operating phase with one of the devices. It will also be seen that, when one of the devices is operating, the other is rendered inoperable to transmit torque. Furthermore, it will be seen that the invention provides a single control for a multi-coupling hydrodynamic drive device that is simple in construction, and economical to manufacture. It will also be seen that selective control of either coupling is obtained without venting the fluid from any of the couplings, thereby reducing the fluid pressure supply pump requirements.

While the invention has been illustrated in its preferred embodiment, it will be clear to those skilled in the arts to which the invention pertains that many changes and modifications may be made thereto without departing from the scope of the invention.

I claim:

1. A hydrodynamic drive device constantly filled with fluid, comprising, a pair of axially aligned and spaced relatively rotatable bladed turbines, and an annular rotatable impeller assembly between and common to said turbines, said assembly comprising a plurality of circumferentially spaced shroud portions together defining internally thereof a pair of back-to-back substantially semi-toroidal shaped fluid cavities each facing one of said turbines, means to communicate fluid between said cavities, an impeller blade mounted in each of the spaces between said shroud portions for an axial sliding movement with respect thereto into and out of said fluid cavities for a fluid drive of said turbines, means securing said blades together for movement as a unit, selectively operable means for moving said blades axially, said blades being of an axial width sufficient to substantially span the axial extent of a cavity when inserted therein but less than the axial space between said turbines whereby axial movement of said blades in one direction by said selectively operable means into one cavity for the drive of the turbine therein substantially withdraws said blades from the other of said fluid cavities thereby substantially preventing a drive of the other turbine.

2. A drive device as in claim 1, wherein said impeller blades are substantially rectangularly shaped in cross section.

3. A drive device as in claim 1, wherein said means for moving said blades includes, a piston secured to and substantially radially aligned with the internal portions of said impeller blades, and fluid pressure means for moving said piston.

4. A drive device as in claim 3, wherein said impeller blades are substantially rectangularly shaped in cross section.

References Cited by the Examiner

UNITED STATES PATENTS

| 1,551,055 | 8/25 | Rieseler | 60—54 X |
| 2,258,302 | 10/41 | Ronning | 60—54 |
| 2,674,905 | 4/54 | O'Brien | 60—54 X |
| 2,995,897 | 8/61 | Parrish et al. | 60—54 |

FOREIGN PATENTS 438,616  11/35  Great Britain.

JULIUS E. WEST, *Primary Examiner.*